United States Patent Office 2,809,311
Patented Oct. 8, 1957

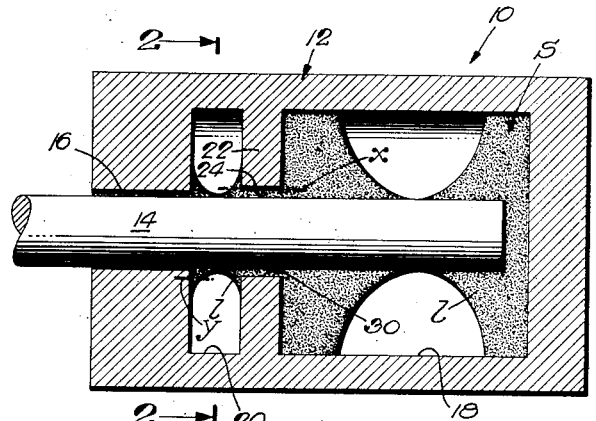
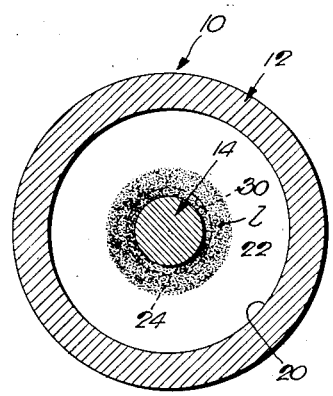
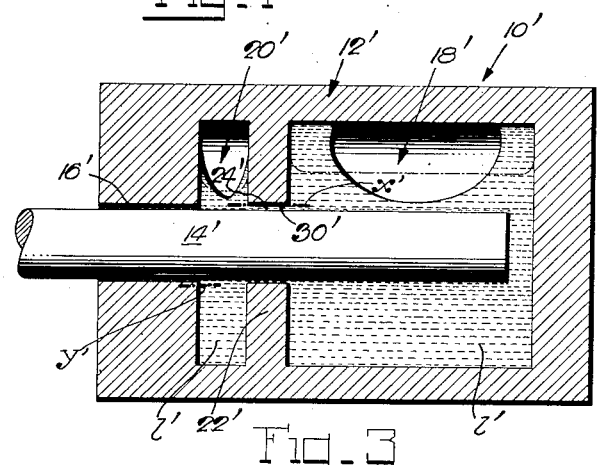
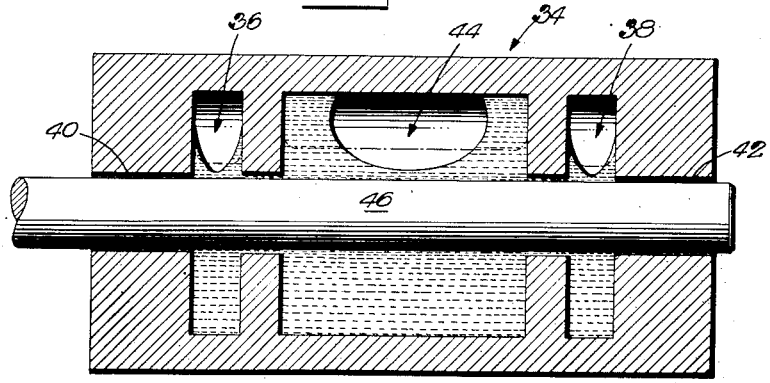

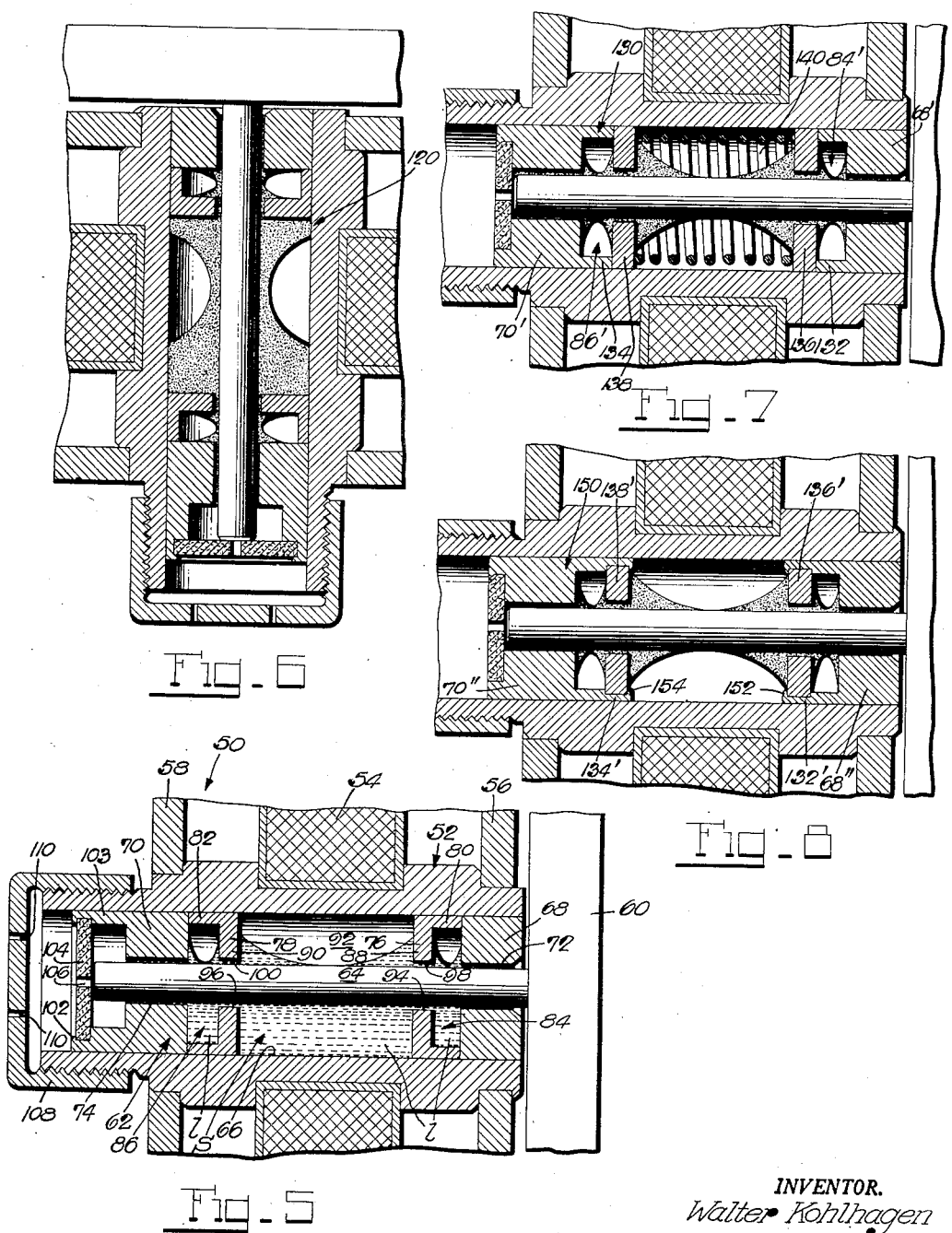

2,809,311

BEARINGS OF THE SEALED VISCOUS LUBRICATION TYPE

Walter Kohlhagen, Elgin, Ill., assignor to The E. Ingraham Company, Bristol, Conn., a corporation of Connecticut Application January 31, 1956, Serial No. 562,561

6 Claims. (Cl. 310—90)

This invention relates to bearings in general, and to bearings of the sealed lubrication type in particular.

It is one of the important objects of the present invention to provide a bearing and journal unit of this type, hereinafter simply referred to as "bearing unit," which holds an initially sealed-in long-life viscous lubricant supply and provides for reliable and adequate journal lubrication for a long time without permitting any appreciable leakage of lubricant.

Thus, it is among the objects of the present invention to provide a bearing unit of this type the lubrication system of which is substantially insensitive to temperature and air-pressure variations and to ordinary shock or vibration and, hence, is to all practical intents and purposes proof against leakage of lubricant from these causes.

It is a further object of the present invention to provide a bearing unit of this type the lubrication system of which is also substantially leakproof in a variety of different positions of the unit, thereby not only readily adapting the latter to many different installations, but also facilitating its shipping and even long-time storage in good shape.

Another object of the present invention is to provide a bearing unit of this type which not only assuredly delivers lubricant to the bearing surface or surfaces whenever needed, but maintains reliable lubricant delivery to these surfaces from the aforementioned long-life lubricant supply therein until at least by far the greater part of the latter has been used up.

A further object of the present invention is to provide a bearing unit of this type which for the diameter of its journal has an exceptionally long lubricated bearing surface, thereby not only to reduce wear of the unit to a minimum, but also to achieve considerable viscous damping of rotary and/or side thrust tendencies of the journal from any cause whatever by the lubricant on the long bearing surface.

It is another object of the present invention to provide a bearing unit of this type which has a main chamber of relatively large volume for the lubricant supply and an adjacent lubricant well of relatively small volume to which the bearing surface leads and which separates the bearing surface from the main chamber and so communicates with the latter remote from the top thereof that the well serves not only as a trap for lubricant-displacing air whenever admitted between the journal and bearing surfaces and, hence, as a barrier to the progress of such air to the main chamber, but serves also as a dispensing chamber from which the bearing surface draws lubricant when needed and into which lubricant from the supply in the main chamber is released in metered quantities only when the lubricant in the dispensing chamber becomes so low as to clear the communication passage to the main chamber for the admission of lubricant-displacing air thereinto. In thus interposing the dispensing chamber between the bearing surface and main chamber, the lubricant supply in the latter is relatively immune to the aforementioned major causes of leakage due to the above obstacles placed in the path of air admission into the main chamber, while the dispensing chamber, by virtue of its relatively small volume and, hence, quick response in variation of the air pressure therein to even slight volumetric changes of the lubricant therein, not only counteracts lubricant-leaking tendencies therefrom from any cause almost at their inception, but also delivers lubricant to the bearing surface, when needed, in quantities which are fairly accurately metered to the exact need for journal lubrication and substantially devoid of any excess that would run off and, hence, be wasted in any event and in some bearing applications even create operational malfunction or even failure.

It is a further object of the present invention to provide a bearing unit of this type which performs well with either oil or grease as lubricant, and in which the aforementioned communication passage between the dispensing and main chambers is, at least in the case of oil as the less viscous lubricant, preferably a capillary passage of some considerable breadth which, when air-pressure and lubricant-level conditions in the dispensing chamber call for lubricant replenishment from the supply, admits only relatively small volumes of air into the main chamber to displace substantially equally small volumes of lubricant from the latter into the dispensing chamber, with the result that lubricant is displaced from the supply into the dispensing chamber in metered quantities best suited to meet the actual need of lubricant in the latter for maintaining adequate journal lubrication without giving rise to conditions conducive to leakage of lubricant therefrom.

Another object of the present invention is to provide a bearing unit of this type in which the journal thereof extends through the aforementioned dispensing chamber and therebeyond toward the adjacent main chamber, and the aforementioned communication passage between the chambers is formed by an endless gap, preferably capillary at least in the case of oil as lubricant, between the journal and a restricted opening between the chambers into which the journal extends so that the communication passage is spread depthwise of the chambers and substantially at the same level as the bearing surface, thereby not only maintaining this passage within reach of by far the greater part of the lubricant supply in the main chamber and, hence, assuredly obtaining delivery of lubricant to the bearing surface, whenever needed, for the longest time, but also maintaining the journal wholly or partly immersed in, and at least within reach of, the lubricant in the dispensing chamber, and also gaining additional bearing area in the opening between the chambers, with the result that rotary and/or side thrust tendencies of the journal are counteracted by quite effective viscous damping action of the lubricant in the relatively large over-all bearing area and also of the lubricant in the dispensing chamber.

It is a further object of the present invention to provide a bearing unit of this type of which the journal even extends into the aforementioned main chamber to a considerable extent, if not throughout, thereby even further enhancing the viscous damping of rotary and/or side thrust tendencies of the journal by the lubricant supply in the main chamber and, hence, not only avoiding pumping of lubricant from the unit if the load on the journal is more or less unbalanced and imparts side thrust to the latter, but also smoothing out occasional or periodic rotary spurts of the journal from any cause or even compelling the latter to turn substantially uniformly under the circumstances, such as the rotor shaft or journal of a reaction-type synchronous motor, for instance, the rotary motion of which is induced by alternating polarity changes of the field poles that compel the rotor into periodic spurts rather than uniform rotary motion.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a longitudinal section through a bearing unit embodying the present invention;

Fig. 2 is a cross section through the same bearing unit as taken on the line 2—2 of Fig. 1;

Fig. 3 is a longitudinal section through a bearing unit which is similar to that of Fig. 1, but uses another type of lubricant;

Fig. 4 is a longitudinal section through a bearing unit embodying the present invention in a modified manner;

Fig. 5 is an enlarged fragmentary longitudinal section through an exemplary synchronous motor having a bearing unit which embodies the present invention in a further modified manner;

Fig. 6 is a fragmentary section through the same motor illustrated in Fig. 5, but using a different type of lubricant;

Fig. 7 is an enlarged fragmentary longitudinal section through an exemplary synchronous motor having a bearing unit which is structurally modified from that of Fig. 6; and Fig. 8 is a fragmentary section through an exemplary synchronous motor having a bearing unit which is further structurally modified from the other bearing units shown.

Referring to the drawings, and more particularly to Figs. 1 and 2 thereof, the reference numeral 10 designates a sealed bearing unit which comprises a bearing bracket or housing 12 and a shaft or journal 14. The housing 12 is provided with a bearing aperture 16 in which the journal 14 is received with capillary clearance. The housing 12 further provides two chambers 18 and 20 which are separated from each other by a transverse partition 22. The supply chamber 18 holds a supply S of viscous lubricant $l$ initially loaded thereinto in any desired quantity calculated to last for the useful life of the bearing unit or at least for years to come, while the dispensing chamber 20 will, initially or in any event after a brief initial run of the unit, hold lubricant $l$ for dispensation to the bearing aperture 16 whenever needed to maintain journal lubrication. The lubricant in the dispensing chamber 20 is replenished, when needed, from the supply S in chamber 18, and to this end there is provided a communication passage 24 between the chambers. The lubricant $l$ in this exemplary bearing unit is a suitable grease.

Referring now to Fig. 3, the bearing unit 10' there shown is, in the present instance, exactly like the bearing unit 10 in Fig. 1, having a housing 12', a journal 14' received with capillary clearance in a bearing aperture 16' in the housing, and lubricant supply and dispensing chambers 18' and 20' which are separated from each other by a transverse partition 22' and in communication with each other by way of a passage 24' through the partition 22'. The lubricant $l'$ in the present bearing unit 10' is a suitable oil which is less viscous than the grease in the bearing unit 10 in Fig. 1.

In both of the described bearing units 10 and 10' with their different types of lubricant the respective bearing apertures 16 and 16' are intended to draw lubricant by capillary action from their dispensing chambers 20 and 20' as needed, while the lubricants in the latter are to be replenished, whenever necessary, from the supplies in the respective chambers 18 and 18' in metered quantities best suited to meet the actual need of lubricant in the dispensing chambers for maintaining adequate journal lubrication without giving rise to conditions conducive to leakage of lubricant therefrom. To this end, the communication passages 24 and 24' between the chambers of the bearing units 10 and 10' are, in any assumed axial disposition of the journals 14 and 14', presently horizontal, arranged below the tops of these chambers. Furthermore, the topmost communication levels between the chambers of both units through the passages 24 and 24' for lubricant-displacing air, should in no event be appreciably below, but may be above, the bottommost lubricant draw levels of the respective bearing apertures 16 and 16'. In the exemplary bearing units 10 and 10', the topmost air communication levels $x$ and $x'$ between the chambers thereof are shown arranged considerably above the bottommost lubricant draw levels $y$ and $y'$ of the respective bearing apertures 16 and 16' and considerably below the tops of the respective chambers.

With the bearing units 10 and 10' arranged as described, and assuming that both chambers of each unit are initially more or less fully charged with lubricant, lubricant from the dispensing chambers 20 and 20' will be drawn by capillary action into the respective bearing apertures 16 and 16' on assembling the journals 14 and 14' therewith. As the lubricant in the bearing apertures 16 and 16' is, on rotation of the respective journals 14 and 14', gradually being used up and replaced by lubricant from the dispensing chambers 20 and 20', atmospheric air will eventually pass through the bearing apertures 16 and 16' into the respective dispensing chambers 20 and 20' until pressure equilibrium is restored between the air in the latter and the atmosphere. This process of replenishing the lubricant in the bearing apertures will be repeated whenever required, the bearing apertures 16 and 16' drawing lubricant from the respective dispensing chambers 20 and 20' for a long time without replenishment of the lubricants in the latter from the supplies in the respective chambers 18 and 18'. This is due to the fact that the dispensing chambers 20 and 20' serve as traps for air admitted from time to time through the respective bearing apertures 16 and 16' and, hence, prevent this air from progressing into the respective supply chambers 18 and 18', with the result that the lubricants in the dispensing chambers are being gradually diminished while maintaining full journal lubrication and the lubricant supplies in the chambers 18 and 18' are left substantially intact, until the lubricant levels in the dispensing chambers have dropped substantialy to the top air communication levels between the dispensing and associated supply chambers through the respective passages 24 and 24'. Whenever lubricant is thereafter drawn by the bearing apertures 16 and 16' from the respective dispensing chambers 20 and 20' in amounts which are displaced by atmospheric air of sufficient volume to raise the air pressures in the dispensing chambers appreciably above those in the associated supply chambers, air is displaced from the dispensing chambers through the communication passages 24 and 24' into the supply chambers and corresponding amounts of lubricant are displaced from the latter into the dispensing chambers, until substantial air pressure equilibrium in the dispensing and supply chambers is restored. Since on each replenishment in this fashion of the lubricant in the dispensing chamber of each bearing unit from the lubricant in the associated supply chamber the lubricant level in the dispensing chamber will rise, more or less, above the topmost air communication level between these chambers, it stands to reason that the lubricant in the dispensing chamber will, after each replenishment, be adequate to maintain satisfactory journal lubrication for quite some time and that air communication between the chambers is intercepted for the same length of time, thereby rendering the lubricant in the supply chamber relatively proof against leakage into the dispensing chamber from such causes as outside temperature and air-pressure variations and ordinary shock or vibration.

While in the case of the more viscous grease as lubricant in the bearing unit of Fig. 1 the communication passage 24 may be of any desired cross-sectional width, within practical limits, its cross-sectional width is preferably kept relatively small so that the amount of grease which each time replenishes the grease in the dispensing chamber is metered to meet the requirements for maintaining adequate journal lubrication for a considerable length of time without giving rise to conditions in the dispensing chamber conducive to any appreciable leakage of grease therefrom. In the case of the less viscous oil as lubricant in the bearing unit of Fig. 3, the cross-sectional width of the communication passage 24' between the chambers 18' and 20', while not necessarily restricted to achieve capillarity, is preferably so restricted, as shown, in order to keep the amount of oil displaced from the supply chamber into the dispensing chamber for each replenishment of the oil in the latter such as to give no rise to conditions conducive to appreciable leakage of oil from the dispensing chamber, yet to meet the requirements for maintaining adequate journal lubrication for a considerable length of time.

In the case of both bearing units 10 and 10' (Figs. 1 and 3), the supply chambers 18 and 18' are preferably considerably larger in volume than the respective dispensing chambers 20 and 20'. Thus, the supply chambers 18 and 18' will advantageously hold relatively large lubricant supplies that will last for years, if not for the useful life of the bearing units, while the dispensing chambers 20 and 20', by virtue of their relatively small volumes and, hence, relatively quick response in variation of the air pressures therein to even slight volumetric changes of the lubricants therein, will not only counteract lubricant-leaking tendencies therefrom from any cause almost at their inception, but also deliver lubricant to the respective bearing surfaces 16 and 16', when needed, in quantities which are fairly accurately metered to the need for full journal lubrication and substantially devoid of any excess that would run off and, hence, be wasted.

By forming the exemplary communication passages 24 and 24' circularly in the partitions 22 and 22' in the bearing units 10 and 10' (Figs. 1 and 3), these communication passages are spread depthwise of the respective chambers 18, 20 and 18', 20', thereby maintaining these passages within reach of by far the major portions of the lubricant supplies in the supply chambers and, hence, making these major portions of the lubricant supplies available for journal lubrication and assuredly obtaining delivery of lubricant to the bearing surfaces, whenever needed, for the longest time.

In the exemplary bearing units 10 and 10' in Figs. 1 and 3, the respective journals 14 and 14' are also shown as extending into the respective dispensing chambers 20 and 20' throughout the lengths of the latter. This is quite advantageous since in view of the described preferred spread of the communication passages 24 and 24' depthwise of the chambers of the respective units, and the further exemplary arrangement of these passages substantially at the same levels as the respective bearing surfaces 16 and 16', the lubricant levels in the dispensing chambers will remain for the longest time sufficiently elevated to maintain the journal lengths therein wholly or partly immersed in these lubricants, with the result that rotary and/or side thrust tendencies of these journals are counteracted by quite effective viscous damping action of the lubricants with which they are in contact.

In the exemplary bearing units 10 and 10' the journals 16 and 16' advantageously extend even beyond the dispensing chambers 20 and 20' and form parts of the widthwise more or less restricted communication passages 24 and 24' by extending into apertures 30 and 30' in the partitions 22 and 22' of the respective bearing units 10 and 10'. This further extension of the journals 14 and 14' into the apertures 30 and 30' in the partitions 22 and 22' of the respective units 10 and 10' not only enhances the viscous damping action of the lubricants on these journals, but also affords additional bearing area for the journals, especially when the passages 24 and 24' are capillary, or nearly capillary.

Finally, the exemplary bearing units 10 and 10' in Figs. 1 and 3 show the journals 14 and 14' advantageously extended into the respective supply chambers 18 and 18' over the greater part of the lengths of the latter, thereby even further enhancing the viscous damping action of the respective lubricants on these journals.

In extending the journals 14 and 14' through the dispensing chambers 20, 20' and apertures 30, 30' into the supply chambers 18, 18' of the exemplary bearing units 10 and 10', respectively, the lubricants therein are also exposed to the peripheral motion of these journals when they turn. Thus, the lubricant next to the peripheries of the rotating journals are, by virtue of their adhesion thereto, induced to turn therewith, and will respond by flowing around the journals in the same direction as, but at much lower speed than, the latter. Transmission of this rotary lubricant motion next to the journals of the lubricants progressively more remote therefrom is increasingly resisted by internal shear forces of these lubricants. Rotary motion of the lubricants in response to rotation of the journals is further resisted by the inner stationary walls of the chambers of the units, with the over-all result that the lubricants tend to pile in the opposite ends of these chambers as has been clearly observed. Thus, in the case of grease as the more viscous lubricant in the bearing unit 10 in Fig. 1, the grease will pile up in the opposite ends of the supply and dispensing chambers 18 and 20, respectively, in a manner like or similar to that shown by way of example, and it may even be that the grease will substantially remain in this piled-up condition when the journal 14 is at rest, depending on the viscosity of the grease. In the case of oil as the less viscous lubricant in the bearing unit 10' in Fig. 3, the oil will, during rotation of the journal 14', also pile up in the opposite ends of the supply and dispensing chambers 18 and 20, respectively, in a manner like or similar to that shown in full lines by way of example, and its rotary motion will progressively decrease at increasingly larger radial distances from the periphery of the journal 14' and at increasingly larger distances from the centers of the chambers 18' and 20' axially of the journal. When the journal 14' comes to rest, however, the less viscous oil in the chambers 18' and 20' will seek and assume normal levels like or similar to those shown in dot-and-dash lines, for example, in Fig. 3. This piling action of the lubricant in either bearing unit 10 or 10' is particularly advantageous since lubricant is thus kept not only within reach of the journal and, hence, within delivery range to its bearing aperture, but also in effective viscous damping relation with the journal, even after the lubricant supply has been depleted to a relatively small part of its original volume.

Fig. 4 shows a modified bearing unit 34 which may in all respects be like the described bearing units 10 and 10' in Figs. 1 and 3, except that the present bearing unit provides two lubricant dispensing chambers 36 and 38 and two bearing apertures 40 and 42, with the lubricant supply chamber 44 arranged intermediate the dispensing chambers. The lubricant in this modified bearing unit is oil, by way of example. In thus providing two spaced bearing apertures 40, 42 for the journal 46 and extending the latter through the supply chamber 44 and both dispensing chambers 36 and 38, the over-all bearing area of the unit is greatly augmented, and the viscous damping action of the lubricant on the journal is further enhanced. In fact, the instant bearing unit with its dual lubricant dispensing chambers and twin bearing apertures and with a single lubricant supply chamber, affords optimum viscous damping action of the lubricant on the journal and, hence, is ideally suited for bearing applications in which the journals carry unbalanced loads which tend to impart side thrusts to the former, or in which the journals receive, occasionally or periodically, undesirable rotary spurt impulses from any cause, or both. Thus, the viscous damping of rotary and/or side thrust tendencies of the journal 46 by the lubricant in the instant bearing unit 34 may well be of such magnitude as to avoid pumping of lubricant from the unit despite considerable unbalance of a load on the journal at either or both ends thereof and ensuing side thrust tendencies of the journal, or to suppress occasional or periodic rotary spurt tendencies of the journal from any cause and compel it to turn uniformly, or at least more nearly uniformly, or both. The excellent viscous damping properties of the instant bearing unit 34 even permit relatively wide tolerances in the diameters of the bearing apertures 40 and 42 without giving rise to lubricant pumping therefrom despite an unbalanced load on the journal 46, thereby not only facilitating the manufacture of the components of the unit and their assembly and, hence, permitting efficient mass production of the unit at relatively low cost, but also permitting the unit to run satisfactorily without any appreciable lubricant leakage even after the bearing apertures or the journal, or both, should show some wear after a long time of use.

Reference is now had to Fig. 5 which shows, by way of example, an advantageous installation of a bearing unit of the type shown in Fig. 4 in a reaction-type synchronous motor 50 having a ferro-magnetic core 52 carrying the usual field coil 54 and having suitably attached to its opposite ends field casing sections 56 and 58 which are provided with the usual alternating field poles, respectively (not shown), that cooperate with the poles of a permanent-magnet rotor 60 to induce rotary motion of the latter on alternate polarity changes of the field poles. As is well known, alternating polarity changes of the field poles of motors of this type compel the rotors into periodic spurts rather than desirable uniform rotary motion. The instant sealed bearing unit 62 installed in the motor is designed not only to compel the rotor 60 into more nearly uniform rotation, but also to prevent pumping of lubricant from the large sealed-in supply and provide for reliable long-term lubrication of the bearing apertures and journal therein despite the usual unbalance of the rotor on the journal which in this case is the rotor shaft 64.

The instant bearing unit 62 is in part formed by an axial bore 66 in the core 52 in which are suitably secured, as by pressfitting, for instance, axially spaced partitions in the form of inserts 68 and 70 that are provided with aligned bearing apertures 72 and 74 in which the rotor shaft 64 is received with capillary clearance. Also pressfitted or otherwise secured in the bore 66 are further partitions or inserts 76 and 78 which are presently cup-shaped and engage with their respective peripheral rims 80 and 82 the adjacent inserts 68 and 70 to form therewith lubricant dispensing chambers 84 and 86 to which the respective bearing apertures 72 and 74 lead and from which they draw lubricant *l* as needed for adequate journal lubrication. The opposed bottoms 88 and 90 of the inserts 76 and 78 define in the bore 66 a supply chamber 92 which holds a relatively large supply S of lubricant and communicates with the dispensing chambers 84 and 86 through passages 94 and 96 which are formed by apertures 98 and 100 in the bottoms 88 and 90 of the inserts 76 and 78 and by the rotor shaft 64 which extends through these apertures with preferably capillary clearance therefrom, the lubricant in the present example being oil. Staked or otherwise secured at 102 in a centrally recessed end 103 of the insert 70 is an end thrust bearing 104 for the rotor shaft 64. The thrust bearing 104 is conveniently in the form of a disc having a vent hole 106 open to the adjacent bearing aperture 74 so that the dispensing chamber 86 may breathe to maintain journal lubrication. A protective cap 108 with a suitable vent hole or holes 110 may be screwed to the end of the core.

In the bearing installation 62 just described, the inserts 68, 70, 76 and 78, which are in surface-to-surface contact with the ferro-magnetic core 52, are preferably made of non-magnetic material, such as brass, for instance, so as not to form a bypass for magnetic field flux from the core 52 to the rotor shaft 64 which is customarily made of steel. To this end also, the thrust bearing 104 is preferably also of non-magnetic material and may conveniently be a fiber disc.

While the vent hole 106 in the thrust bearing 104 has been described as serving for breathing purposes of the dispensing chamber 86, it also serves for quick displacement of excess oil from the initially lubricant-charged bearing unit 62 on assembling the rotor shaft 64 therewith by passing the same through the bearing aperture 72 and successive charged chambers 84, 92 and 86 into the bearing aperture 74. In this connection, it should be noted that the bearing unit in a small-size synchronous motor may be charged to its full, or substantially full, capacity with oil through the bearing aperture 72 without incurring appreciable leakage or loss of oil, if any, through the vent hole 106 before the rotor shaft is being assembled with the bearing unit, so that the oil supply in the latter may well be at a maximum when the rotor shaft has been placed into the unit.

Fig. 6 shows a motor bearing installation 120 which is in all respects like that of Fig. 5, except that grease is used as lubricant. While the bearing installation 120 is shown in an apparent vertical disposition, it is to be understood that the same is preferably disposed in a position other than horizontal, when in use, in order to secure the aforementioned important advantages springing from the described lubricant level regulation under air-pressure control in the dispensing and supply chambers. However, the exemplary vertical illustration of the bearing installation 120 indicates that, at least when more viscous grease is used as lubricant, the installation is substantially leakproof while the motor is being shipped, or even stored for a long time, in any disposition including vertical disposition.

Fig. 7 shows a motor bearing installation 130 which is in all respects like that of Fig. 5, except that in this case the dispensing chambers 84' and 86' are formed by recessed portions 132 and 134 of the inserts 68' and 70' and discs 136 and 138, respectively, of which the latter are held against the respective recessed insert portions 132 and 134 by an interposed compression spring 140. This construction is feasible at least when the more viscous grease constitutes the lubricant used, as shown, since in that case slight air leakage that may occur between the supply and dispensing chambers over the tops of the spring-held discs 136 and 138 will have no appreciable adverse effect upon the performance of the bearing unit.

Fig. 8 shows still another motor bearing installation 150 which is essentially like that of Fig. 7, except that the discs 136' and 138' are staked at 152 and 154 to the recessed portions 132' and 134' of the inserts 68" and 70", respectively.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A bearing unit, comprising a housing having a sealed lubricant supply chamber, opposite bearing apertures, sealed lubricant dispensing chambers intermediate said supply chamber and apertures, respectively, and open to the latter, and other apertures in axial alignment with said bearing apertures and providing communication between said supply chamber and dispensing chambers, respectively, said apertures in horizontal disposition being below the tops of said chambers; a journal received in said bearing apertures with capillary clearance therefrom and extending through said chambers and through said other apertures with clearance therefrom to define in each of the latter an annular passage of restricted cross-sectional width to limit each displacement of lubricant therethrough to a volume many times smaller than that of the adjacent dispensing chamber; and an end thrust bearing for said journal adjacent to and externally sealing one of said bearing apertures and having a vent in communication with the latter.

2. A sealed bearing unit in a reaction-type synchronous motor having a field structure, comprising a rotor shaft; a ferromagnetic core included in the field structure and having an axial bore; and longitudinally spaced nonmagnetic transverse partitions in said bore defining therein opposite lubricant dispensing chambers and a lubricant-holding supply chamber next to and intermediate said dispensing chambers, said partitions having centrally of said bore axially aligned apertures of slightly larger diameter than said shaft of which the outermost are bearing apertures leading into said dispensing chambers, respectively, and the remaining ones provide communication between said supply chamber and said dispensing chambers, respectively, said rotor shaft extends through said chambers and is received in said apertures with clearance of which at least the clearances within said bearing apertures have capillary action, said rotor shaft extends within the interior of said supply chamber substantially throughout the extent of the latter axially of said bore, and said chambers are sealed except at said clearances.

3. A sealed bearing unit in a reaction-type synchronous motor having a field structure, comprising a rotor shaft, a ferromagnetic core included in the field structure and having an axial bore; a pair of longitudinally spaced outer nonmagnetic transverse partitions in said bore; a pair of longitudinally spaced inner nonmagnetic transverse partitions in said bore between said outer partitions therein and defining in said bore a lubricant-holding supply chamber; and ring-type nonmagnetic spacers fittedly received in said bore between the outer and adjacent inner partitions, respectively, defining with the latter lubricant dispensing chambers, respectively, on opposite ends of said supply chamber, said partitions having centrally of said bore axially aligned apertures of diameters which are smaller than the inside diameters of said spacers and slightly larger than the diameter of said shaft, of which the apertures in said outer partitions are bearing apertures leading into said dispensing chambers, respectively, and the remaining apertures provide communication between said supply chamber and said dispensing chambers, respectively, said rotor shaft extends through said chambers and is received in said apertures with clearance of which at least the clearance within said bearing apertures have capillary action, said rotor shaft extends within the interior of said supply chamber substantially throughout the extent of the latter axially of said bore, and said chambers are sealed except at said clearances.

4. A sealed bearing unit in a reaction-type synchronous motor as set forth in claim 3, in which each of said spacers is formed integrally with one of the partitions between which it extends.

5. A sealed bearing unit in a reaction-type synchronous motor as set forth in claim 3, in which said outer partitions are fixed in said bore and said inner partitions are axially slidable therein, and there is further provided a compression spring in said bore interposed between said inner partitions therein to hold the latter against the adjacent spacers.

6. A sealed bearing unit in a reaction-type synchronous motor as set forth in claim 3, in which said spacers are formed integrally with said outer partitions, respectively, and said inner partitions are staked to said spacers, respectively.

7. A bearing unit, comprising a journal; and a housing having a sealed lubricant supply chamber with a longitudinal axis and an inner circumferential surface spaced throughout from said axis at a greater distance than the radius of said journal; a bearing aperture coaxial with said supply chamber and of slightly larger diameter than said journal; a sealed lubricant dispensing chamber intermediate said supply chamber and aperture open to the latter and having an inner circumferential surface spaced throughout from said axis at a greater distance than the radius of said journal, and another aperture in axial alignment with said bearing aperture and of slightly larger diameter than said journal and providing communication between said chambers, said journal extending through said dispensing chamber and into the interior of said supply chamber over the greater part of the axial extent of the latter and beng received in said apertures with clearance of which at least that within said bearing aperture has capillary action.

8. A bearing unit, comprising a journal; and a housing having a sealed lubricant supply chamber with a longitudinal axis and an inner circumferential surface spaced throughout from said axis at a greater distance than the radius of said journal, opposite bearing apertures coaxial with said supply chamber and of slightly larger diameters than said journal, sealed lubricant dispensing chambers intermediate said supply chamber and apertures, respectively, open to the latter and having inner circumferential surfaces, respectively, spaced throughout from said axis at a greater distance than the radius of said journal, and other apertures in axial alignment with said bearing apertures and of slightly larger diameters than said journal and providing communication between said supply chamber and dispensing chambers, respectively, said journal extending through said dispensing chambers and through the interior of said supply chamber substantially throughout the axial extent of the latter, and being received in said apertures with clearance of which at least the clearances within said bearing apertures have capillary action.

References Cited in the file of this patent
UNITED STATES PATENTS

| 1,967,782 | Putnam | July 24, 1934 |
| 2,493,999 | Riley | Jan. 10, 1950 |
| 2,678,855 | Manson | May 18, 1954 |